UNITED STATES PATENT OFFICE.

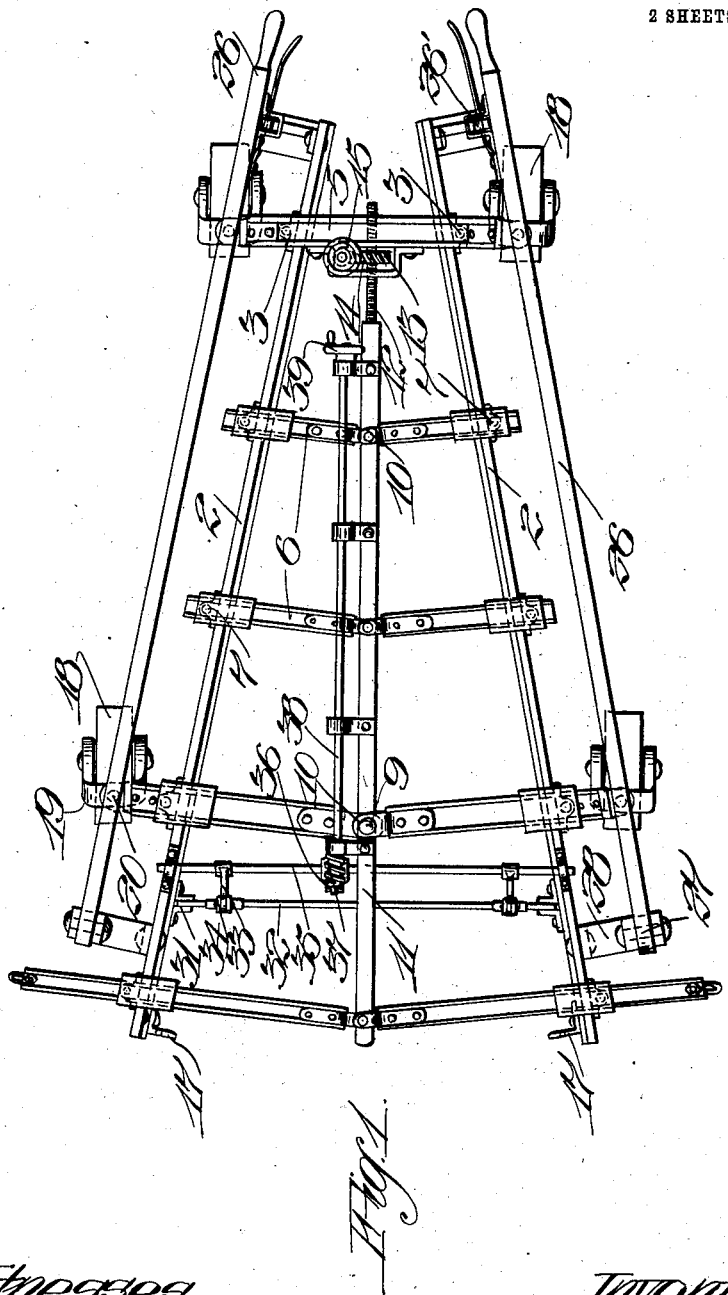

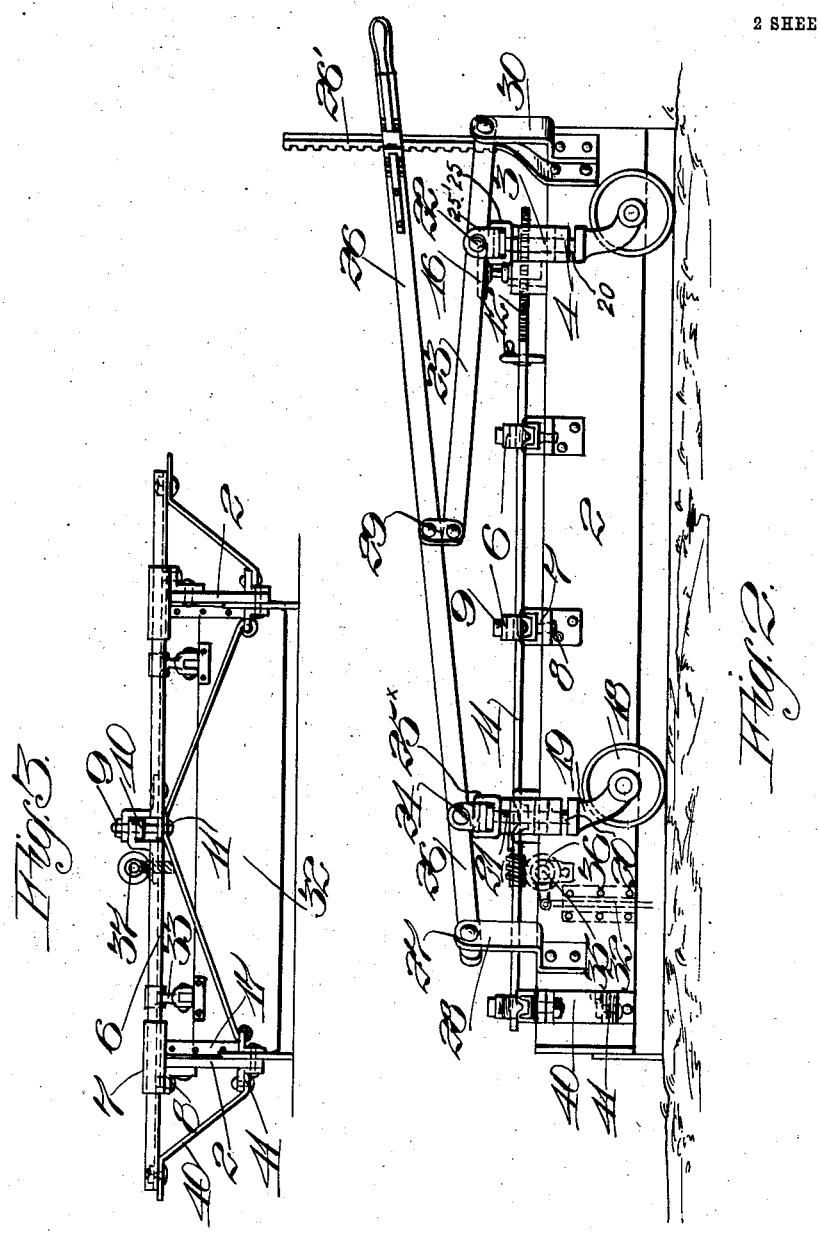

WILLIAM R. BORDGES, OF SALINAS, CALIFORNIA.

LEVEE-MACHINE.

1,022,768.  Specification of Letters Patent.  Patented Apr. 9, 1912.

Application filed April 4, 1911. Serial No. 618,915.

*To all whom it may concern:*

Be it known that I, WILLIAM R. BORDGES, citizen of the United States, residing at Salinas, in the county of Monterey and State of California, have invented new and useful Improvements in Levee-Machines, of which the following is a specification.

This invention relates to machines for making levees or dikes to form irrigating systems.

The object of the present invention is to provide a machine for throwing up levees or dikes for use particularly in checking a field for irrigation purposes where the area is divided into checks or squares bound by small dikes or levees which may be of various depths and of suitable width.

A further object of the present invention is to provide a machine adaptable for various adjustments, whereby levees or check forming ridges of different widths and heights may be raised; to provide a machine which will form raised levees or dikes, the material of which the dikes are formed being thoroughly interlaced or interlocked to afford greater strength, and thereby being better able to resist water over the area of the checks; and also to provide an apparatus which may be readily converted into a leveler, and which is adaptable for use as a leveling machine; and also for the formation of ditches above the surface of level ground.

The invention consists of the parts and the combination and construction of parts as hereinafter more fully described and claimed, having reference to the accompanying drawings, in which—

Figure 1 is a plan view of the machine. Fig. 2 is a side elevation of the same. Fig. 3 is a detail showing the leveling attachment as applied.

In the illustrated embodiment of my invention, 2 represents substantial, vertically disposed gathering plates, which may be of metal or other suitable material of a height and length which will be determined according to the requirements, and may be made small for work in orchards or other places, and which may be made of larger size when it is desired to check up large areas. The vertical gathering plates 2 are pivotally mounted upon studs or bolts 3, carried by suitable journals 4, which are secured to a substantial cross beam or tie 5 which straddles the upper edges of the vertical gathering plates 2, and about which pivots 3 the plates 4 are radially adjustable in a horizontal plane.

It is a desideratum to provide a simple and substantial means whereby the ends of the outspreading gathering plates 2 may be moved to and from each other to permit of the intake of a wider stretch of soil from the top surface of the ground over which the apparatus is running. This angular relative adjustment of the vertical plates 2 is accomplished by providing a plurality of pairs of horizontal links or radius rods 6, each pivoted to respective bolts or equivalent members 7 journaled in suitable brackets 8, which are secured to the vertical gathering plates 2. The inner ends of the radius rods 6 are pivoted in pairs upon central bolts or pins 9, supported in stirrups or brackets 10, rigidly secured to the upper surface of the adjacent pairs of link ends. These several pairs of links form toggle members by which the relative angle of the scraping plates 2 may be increased or decreased by the operator through suitable means. In the present instance, I have shown as one form of means for accomplishing this angular adjustment of the plates 2 a centrally disposed connecting rod 11, which may be mounted upon the several link-connecting bolts 9.

The adjusting rod 11 extends rearwardly from the forward flaring open ends of the plates 2 to a position convenient to the operator, for whom may be provided a seat or platform upon the tie or saddle 5 at the smaller end of the machine. That end of the connecting rod, 11, which is adjacent the saddle, 5, is preferably provided with a screw-threaded portion, 12, upon which is mounted a worm wheel, 13, supported within a suitable strap or housing, 14.

A suitably disposed worm 15 meshes with the worm wheel 13 and may be turned by means of a hand wheel 16. By virtue of the several pivotal connections between the ends of the radius links 6 and the vertical plates 2, when the operator turns the hand wheel 16 and revolves the worm 15, the worm wheel 13 revolves and forces the screw portion 12 and its link 11 backwardly or forwardly, as the operator desires. When the several pairs of toggle links are relatively straightened or brought into alinement by the operating link 11, their pivots 9 move rearwardly, thus expanding the vertical sides 2 so as to further open the forward intake end of the machine. As the forward end of the machine is opened, there is a proportionate decrease in the distance transversely across the rear ends of the plates 2, which results in forming a higher levee or ridge due to the larger volume of material scraped from the ground at the forward end. Power may be applied to draw the machine at the forward open end of the plate 2 by hitching to shackle-receiving plates 17 any suitable source of power, such as a traction engine or animal team.

One of the important provisions of my levee-forming machine is the means whereby the side-gathering-boards 2 may be independently, vertically adjusted relative to each other so as to permit the lowering of the boards sufficiently into the ground to scrape or gather a volume of material which will eventually determine the height of the molded levee. This means comprises a plurality of caster wheels 18, mounted in suitable yokes 19, from which there project upwardly substantial pins 20, guided in suitable bearings 21, which are attached at the outer end of the saddle 5, and at the outer ends of one set of toggle links 6. To the upper ends of these vertical pins or shafts 20, are connected, by means of pivots, 22, a pair of levers, 23, one over each of the rear caster wheels, 18. The upper ends of the vertical pins or shafts, 20, are suitably connected to the levers, 23, as by means of a link, 25, on the pin embracing a clip, 25', through which the pivot of the lever passes. A similar construction appears at the forward end of the machine, where the forward caster wheel has its vertical shaft likewise connected to a link, 25ˣ, embraced by a clip which is connected by a pivot, 24, to the forward end of an operating lever, 26.

There is one of the operating levers 26 on each side of the machine, and the forward ends of the operating levers 26 are connected at 27 by suitable means, as links 28, to the forward ends of the scraping boards 2. The operating levers 26 are connected by links 29 to the forward ends of the levers 23 which are fulcrumed at 22 above the rear wheels 19. The rear portions of the levers 26 are extended rearwardly so as to be within convenient reach of the operator of the apparatus, and when the levers 26 are depressed by the operator the forward ends of the levers 23 are depressed and the rear ends of the gathering plates 2 are lifted by a link, or other suitable connection, 30 simultaneously with which action the forward ends of the plates 2 are elevated by means of the connected links 28. If the operator desires to form a relatively deep levee, he lowers the forward ends of the scraping blades 2 so as to cause them to scrape a larger amount of earth, and, as the machine is pulled forwardly, this earth is converged or deflected toward the rear and central portion of the machine and is heaped up by the contracted rear ends of the plates 2.

It will be seen then that the operator has absolute control of the machine and can adjust it so as to scrape a larger or lesser amount of material to form a required sized levee. An advantage of this apparatus is that the material which is required to form the levee is not dug from a small, deep channel adjacent the sides of the levee, but the outspreading ends of the scraping boards 2 permit of a large area to be covered and thus a shallow cut is made. Again, an important feature of the machine is that the levees formed are thoroughly interlocked or interlaced inherently by reason of the constant mixture and overturning of the soil which goes to form the body of the levee.

It has been found in preparing large areas of ground for irrigation by the checking system, that is where strings of crossed levees are formed, resulting in depressions between the levees, that frequently slight elevations above the normal level of the country operate against the effectiveness of the irrigated area, because these slight elevations either are not covered at all when the zone is flooded, or else the water is very shallow over them. It is, therefore, desirable in providing a levee forming machine to provide for attachments whereby slight elevations in the area to be irrigated can be easily and quickly removed and the excess soil leveled off into other adjacent low points. To that end, I attach to the insides of the vertical plates 2, guides 31 between which is adjustable a scraper 32, which is adapted to be lowered or lifted relative to the plates 2 by means of a crank 33 connected by links 34 to the upper edge of the scraper 32. These cranks 33 are fixed upon a shaft 35, to which motion may be transmitted by a worm wheel 36 secured thereon, and which is actuated by a worm 37 on a rod 38 which is extended rearwardly convenient to the operator, and which he may turn by means of a crank 39. The leveling scraper 32 and its actuating device is detached from the machine when the scraper blades are to be adjusted. The levers 26 are retained in their adjusted position by means of suitable racks or equivalent devices 26', secured on the side plates 2 adjacent the operator.

In addition to forming a traveling support allowing the apparatus to be drawn around the country with the scraping or gathering boards elevated so as to be inoperative, the caster wheels 18 afford a convenient means for permitting the apparatus to be readily turned in its position when it is desired to reverse the line of a levee, or to start a new levee at an angle to one just formed. In this form of an apparatus it is very essential that it be made substantial and rigid, and to accomplish this rigidity I provide at suitable points various braces, as 40, which may be pivoted at their lower ends to the plates 2 by means of suitable pins or bolts 41.

Having thus described my invention, what I claim and desire to secure by Letters-Patent, is—

1. An improved levee-forming machine, having in combination a pair of vertically disposed, rearwardly projecting gathering members, a saddle extending crosswise between the members and having pivots on which said members are pivoted, means including toggle links and connecting operating devices for varying the angular relation of the gathering members, freely turnable caster wheels upon which the gathering members are adjustably supported, and braces flexibly connected to said members.

2. A levee-forming machine comprising a pair of vertical scraping and gathering members, a saddle, pivots on said saddle on which said members are mounted between their ends, means for varying the angular relation of said members, freely turnable caster wheels upon which the scraping and gathering members are adjustably supported, and links and lever connections between said wheels and the members whereby the latter may be vertically adjusted.

3. In a levee-forming machine, the combination of vertical gathering members, pivots upon which said members are mounted for adjustment between their ends, a saddle upon which said pivots are secured, means for swinging the gathering members about their pivots, and caster wheels supporting the gathering members, said means for swinging these last named members comprising toggle links connected at their outer ends to the gathering members, and operating instrumentalities connected to said links.

4. A check-forming machine including a pair of vertical, angularly disposed gathering members, toggle links connected at their outer ends to said members, an operating rod connected to the jointed ends of the toggle links, means for actuating the operating rod to open and close the gathering members, and means for adjusting said last named members to and from the ground.

5. A check-forming machine including a pair of vertical, angularly disposed gathering members, toggle links connected at their outer ends to said members, an operating rod connected to the jointed ends of the toggle links, means for actuating the operating rod to open and close the gathering members, and means for adjusting said last named members to and from the ground, said means including caster-wheels and links and levers connected to said caster wheels and the gathering members.

6. A check-forming machine including a pair of vertical, angularly disposed gathering members, toggle links connected at their outer ends to said members, an operating rod connected to the jointed ends of the toggle links, means for actuating the operating rod to open and close the gathering members, means for adjusting said last named members to and from the ground, said means including caster-wheels and links and levers connected to said caster wheels and the gathering members, and a leveling device adjustably supported between the forward open ends of the gathering members.

In testimony whereof I have hereunto set my hand in the presence of two subscribing witnesses.

WILLIAM R. BORDGES.

Witnesses:
 JESSE B. IVERSON,
 JOSEPH S. BORDGES.

---

Copies of this patent may be obtained for five cents each, by addressing the "Commissioner of Patents, Washington, D. C."